United States Patent
Li et al.

(10) Patent No.: US 8,272,141 B2
(45) Date of Patent: Sep. 25, 2012

(54) PROBE APPARATUS

(75) Inventors: Shen-Chun Li, Taipei Hsien (TW); Shou-Kuo Hsu, Taipei Hsien (TW); Hsien-Chuan Liang, Taipei Hsien (TW); Ying-Tso Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 274 days.

(21) Appl. No.: 12/784,511

(22) Filed: May 21, 2010

(65) Prior Publication Data

US 2011/0179660 A1    Jul. 28, 2011

(30) Foreign Application Priority Data

Jan. 23, 2010  (CN) .......................... 2010 1 0300633

(51) Int. Cl.
*G01B 5/00* (2006.01)
*G01B 5/02* (2006.01)
*G01B 21/02* (2006.01)

(52) U.S. Cl. ............... 33/811; 33/783; 33/557

(58) Field of Classification Search ............ 33/501.6, 33/503, 556, 557, 558, 560, 561, 783, 784, 33/787, 788, 789, 791, 793, 806, 810, 811, 33/812, 832, 833
See application file for complete search history.

(56) References Cited

U.S. PATENT DOCUMENTS

| | | | | |
|---|---|---|---|---|
| 1,768,828 A | * | 7/1930 | Carter | 33/663 |
| 3,688,411 A | * | 9/1972 | Asano et al. | 33/501.6 |
| 3,745,660 A | * | 7/1973 | Asano et al. | 33/557 |
| 3,755,909 A | * | 9/1973 | Asano et al. | 33/501.03 |
| 3,805,393 A | * | 4/1974 | Lemelson | 33/555 |
| 4,258,567 A | * | 3/1981 | Fisher, III | 73/146 |
| 4,856,199 A | * | 8/1989 | Merrill et al. | 33/203.17 |
| 5,334,934 A | * | 8/1994 | Viertl | 324/220 |
| 5,465,496 A | * | 11/1995 | Axon | 33/522 |
| 6,425,285 B1 | * | 7/2002 | Fujii et al. | 73/104 |
| 7,246,450 B1 | * | 7/2007 | Mason | 33/784 |
| 7,322,229 B2 | * | 1/2008 | Wilhelm | 73/104 |
| 7,373,807 B2 | * | 5/2008 | Hama | 73/105 |
| 2009/0093910 A1 | * | 4/2009 | Grosz et al. | 700/275 |

FOREIGN PATENT DOCUMENTS

JP   55027981 A   *   2/1980
JP   60056202 A   *   4/1985

* cited by examiner

*Primary Examiner* — R. A. Smith
(74) *Attorney, Agent, or Firm* — Altis Law Group, Inc.

(57) ABSTRACT

An exemplary probe apparatus includes a fixture, a first probe assembly, a motor, a lead screw, two guide members, a second probe, and a reduction gear unit. The first probe assembly is fixedly attached to the fixture and includes a first probe. The motor has a drive shaft attached to the fixture. The lead screw is coupled to the fixture. The two guide members are attached to the fixture and parallel to the lead screw. The second probe assembly is moveably attached to the lead screw and the at least one guide member, and includes a second probe. The reduction gear unit is coupled to the drive shaft and the lead screw to transmit power from the motor to the second probe assembly through the lead screw. The second probe assembly is configured for moving the second probe towards or away from the first probe along the two guide members.

19 Claims, 2 Drawing Sheets

PROBE APPARATUS

CROSS-REFERENCE TO RELATED APPLICATION

This application is related to, and claims the benefit of, a foreign priority application filed in China as Application No. 201010300633.6 on Jan. 23, 2010. The related application is incorporated herein by reference.

BACKGROUND

1. Technical Field

The disclosure generally relates to probe apparatuses and, particularly, to a probe apparatus capable of precisely measuring an object.

2. Description of Related Art

A typical probe apparatuses includes a servo motor for moving a probe to measuring an object. However, it is difficult for the servo motor to precisely move the probe to a predetermined position. Accordingly, precisely measuring the object is difficult.

What is needed, therefore, is a probe apparatus which can overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the exemplary probe apparatus. Moreover, in the drawings, like reference numerals designate corresponding parts throughout the several views.

DETAILED DESCRIPTION

Embodiment of the probe apparatus will now be described in detail below and with reference to the drawings.

Figure 1:
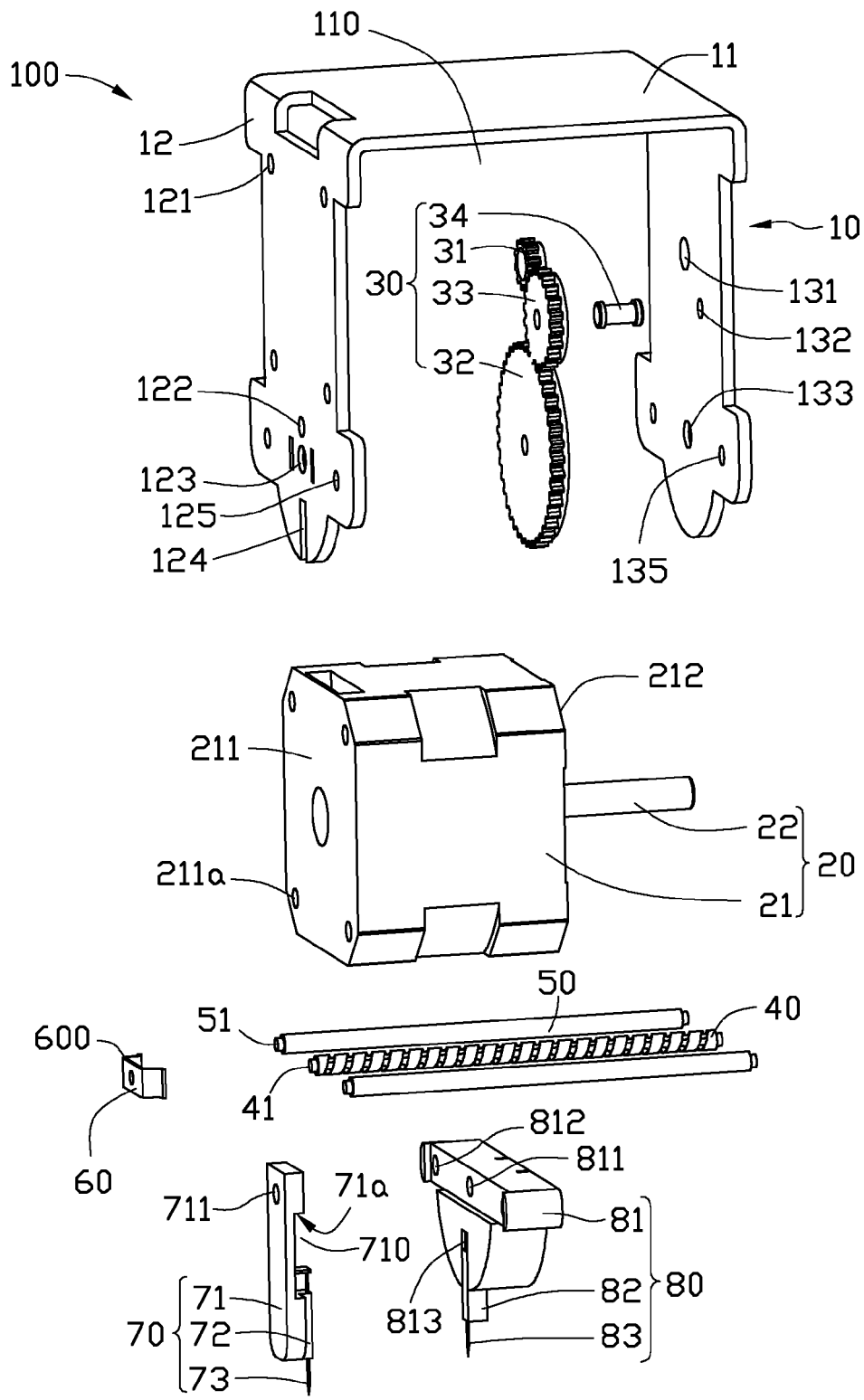
FIG. 1 is an isometric, exploded view of a probe apparatus, in accordance with an exemplary embodiment.
Figure 2:
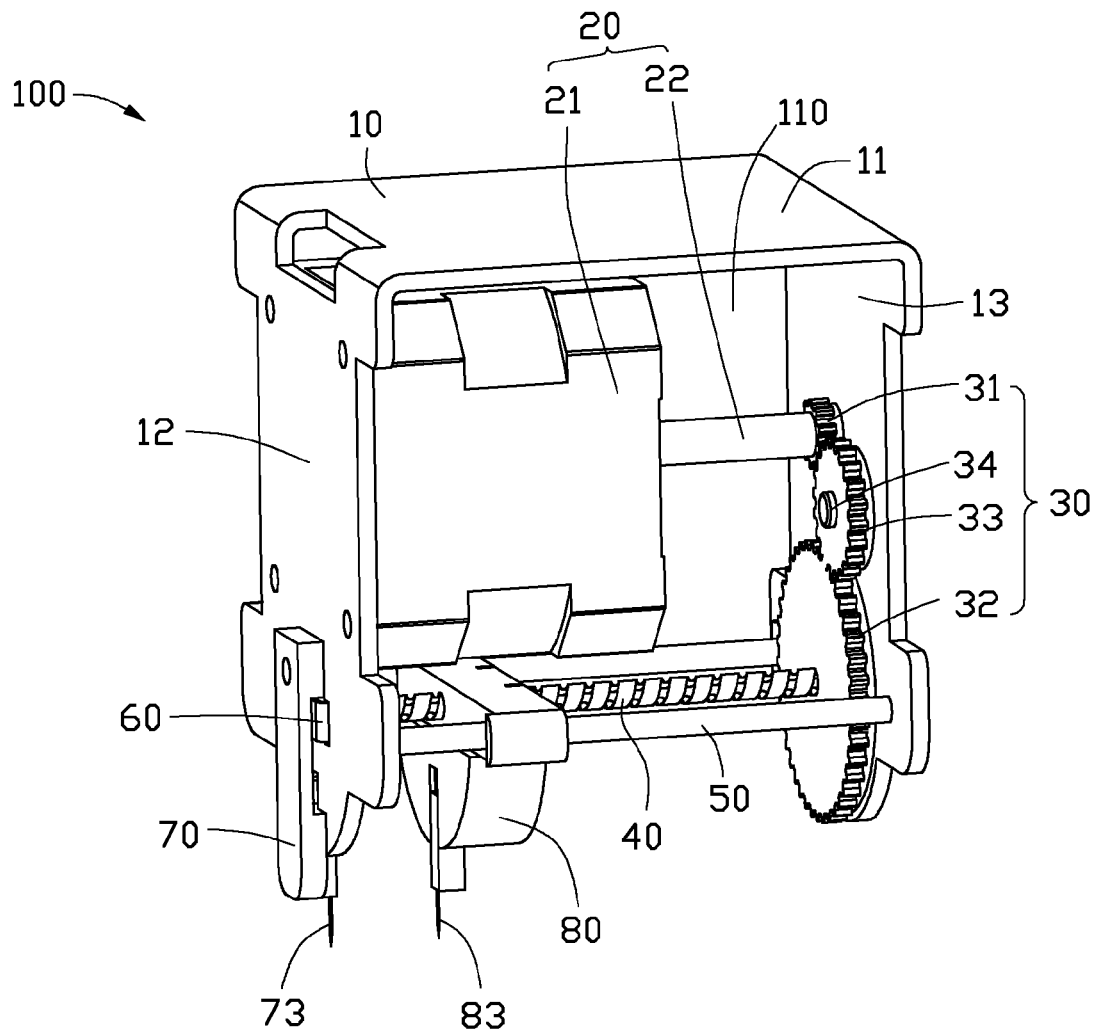
FIG. 2 is an isometric and assembled view of the probe apparatus of FIG. 1.

Referring to FIGS. 1 and 2, a probe apparatus 100 in accordance with an exemplary embodiment is shown. The probe apparatus 100 includes a fixture 10, a motor 20, a reduction gear unit 30, a lead screw 40, at least one guide member 50, a first probe assembly 70, and a second probe assembly 80.

The fixture 10 includes a top board 11, a first pedestal 12, and a second pedestal 13. The top board 11 is generally rectangular. The first and the second pedestals 12 and 13 respectively extend downwardly from opposite sides of the top board 11. In particular, the first and the second pedestals 12 and 13 are substantially parallel with one another. The top board 11, and the first and the second pedestals 12 and 13 cooperatively define a receiving space 110.

The first pedestal 12 has four first fixing holes 121, a second fixing hole 122, a first shaft hole 123, and a first slot 124 defined therein. In this embodiment, the four first fixing holes 121 are arranged in rows and columns. The first shaft hole 123 is arranged at a side of the first fixing holes 121 facing away from the top board 11. The second fixing hole 122 is arranged between the first fixing holes 121 and the first shaft hole 123. The first slot 124 are arranged at a side of the first shaft hole 123 facing away from the top board 11, and the first slot 124 extends in a direction perpendicular to the top board 11. The first pedestal 12 may have two third fixing holes 125 defined therein. In this embodiment, the two third fixing holes 125 are arranged at two opposite sides of the first shaft hole 123. In particular, the two third fixing holes 125 and the first shaft hole 123 are arranged in an imagined line parallel to the top board 11.

The second pedestal 13 is similar to the first pedestal 12 in structure, and has a second shaft hole 133 and two fourth fixing holes 135 defined therein. The second shaft hole 133 faces the first shaft hole 123. The two fourth fixing holes 135 face the two respective third fixing holes 125. In this embodiment, the second pedestal 13 further has a third shaft hole 131 and a fourth shaft hole 132 defined therein. The third shaft hole 131 is arranged adjacent to the top board 11. The fourth shaft hole 132 is arranged between the second shaft hole 133 and the third shaft hole 131.

In this embodiment, the motor 20 can be a step motor, and includes a main body 21 and a drive shaft 22. The main body 21 is generally rectangular, and includes a first surface 211 and a second surface 212 at two opposite sides thereof. In this embodiment, the main body 21 has four fifth fixing holes 211a defined therein. The drive shaft 22 extends out of the second surface 212. In assembling the motor 20, the main body 21 can be arranged in the receiving space 110 to align the four fifth fixing holes 211a with the four respective first fixing holes 121, thus the main body 21 can be fixed to the first pedestal 12 by using four respective screws (not shown). Generally, each of the screws can be fixedly received in a corresponding first fixing hole 121 and a corresponding fifth fixing hole 211a. The drive shaft 22 may align with the third shaft hole 131. Thus, a bearing (not shown) can be provided to connect the drive shaft 22 to the second pedestal 13. In one typical example, the bearing can be mounted in the third shaft hole 131 to receive a distal end of the drive shaft 22. Thereby, the drive shaft 22 can be rotatably coupled to the second pedestal 13 by the bearing.

The lead screw 40 includes two distal ends 41. In assembling the lead screw 40, two bearings (not shown) can be provided to connect the lead screw 40 to the first pedestal 12 and the second pedestal 13. The two bearings may, for example, be mounted in the respective first shaft hole 123 and second shaft hole 133 to receive the ends 41 of the lead screw 40. Thereby, the lead screw 40 can be rotatably coupled to the first and the second pedestals 12 and 13 by the two bearings.

The reduction gear unit 30 includes a first gear 31, a second gear 32, and a third gear 33. The first gear 31 is coupled to the drive shaft 22. The second gear 32 is coupled to the lead screw 40. The third gear 33 is meshed with the first gear 31 and the second gear 32. The third gear 33 has a passive shaft 34. The passive shaft 34 is attached to the second pedestal 13. A bearing (not shown) can be provided to couple the passive shaft 34 to the second pedestal 13. In one typical example, the bearing can be mounted in the fourth shaft hole 132 to receive a distal end of the passive shaft 34. Thereby, the passive shaft 34 can be rotatably coupled to the second pedestal 13 using the bearing. The reduction gear unit 30 is configured for transmitting power from the motor 20 to the lead screw 40. In this embodiment, the number of teeth on the third gear 33 is greater than on the first gear 31, and the number of teeth on the second gear 32 is greater than on the third gear 33. With this configuration, a gear ratio between the first gear 31 and the third gear 33 is less than 1, and a gear ratio between the third gear 33 and the second gear 32 is also less than 1. Overall, a total gear ratio of the reduction gear unit 30 is less than 1.

In this embodiment, the probe apparatus 100 includes two guide members 50, which can each be a guide pin having two distal ends 51. In this embodiment, the two distal ends 51 of each guide member 50 can be fixedly received in the third fixing holes 125 and the fourth fixing holes 135 respectively. Thereby, the two guide members 50 can be fixedly coupled to the first and the second pedestals 12 and 13. In alternative embodiments, the probe apparatus 100 may include only a guide member 50 coupled to the first and the second pedestals 12 and 13.

The first probe assembly 70 includes a first base 71, a first fixing portion 72, and a first probe 73. The first base 71 is elongated. The first fixing portion 72 extends from the first base 71. In the illustrated embodiment, the first probe 73 is fixed to the first fixing portion 72, and is parallel with a lengthwise direction of the first base 71. Alternatively, the first probe 73 could be movably attached to the fixture 10. The first base 71 has a sixth fixing hole 711 defined therein. The first base 71 can be fixed to the first pedestal 12 by using a screw (not shown). Generally, the screw can be fixedly received in the second fixing hole 122 and the sixth fixing hole 711. The fixing portion 72 is received in the first slot 124. The probe apparatus 100 may further include an engaging block 60 for adjusting orientation of the first probe 73. The engaging block 60 includes a flat surface 600. The first base 71 has a recess 710 defined therein, and the first base 71 includes an inner side surface 71a defined in the recess 710. The inner side surface 71a is perpendicular to the first probe 73. The engaging block 60 can be fixed to the first pedestal 12 with the engaging surface 600 parallel to the top base 11. The first base 71 is fixed to the first pedestal 12 with the inner side surface 71a fittingly engaging the flat surface 600 of the engaging block 60. With this configuration, the orientation of the first probe 73 can be adjusted to be perpendicular to the top base 11.

The second probe assembly 80 includes a second base 81, a second fixing portion 82, and a second probe 83. The second base 81 has a second slot 813 defined therein. The second probe 83 is fixed to the second fixing portion 82. A portion of the second fixing portion 82 is received in the second slot 813. In this embodiment, the second base 81 has a first through hole 811 and two second through holes 812 defined therein. The first through hole 811 is located between the two second through holes 812. In assembling the second probe assembly 80, the lead screw 40 passes through the first through hole 811 before the lead screw 40 is coupled to the first and the second pedestals 12 and 13. The two guide members 50 pass through the two respective second through holes 812 before the two guide members 50 are fixed to the first and the second pedestals 12 and 13. In one typical example, the first through hole 811 can be a screw hole meshed with the lead screw 40. In another example, a ball screw bearing (not visible) can be provided to couple the lead screw 40 to the second base 81. The ball screw bearing can be mounted in the first through hole 811 to receive a portion of the lead screw 40.

In operation, the second base 81 moves the second fixing portion 82 and the second probe 83 towards or away from the first probe 73. To move the second probe 83 away from the first probe 73, the motor 20 rotates the first gear 31 counter-clockwise (from the perspective of FIG. 2). The counter-clockwise rotation of the first gear 31 rotates the third gear 33 clockwise. The clockwise rotation of the third gear 33 rotates the second gear 32 and the lead screw 40 counter-clockwise. Because the second gear 33 and the second base 81 are in engagement with one another, a counter-clockwise rotation of the lead screw 40 moves the second base 81 away from the first probe 73. The second base 81 accordingly moves the second probe 83 away from the first probe 73. Conversely, to move the second probe 83 towards the first probe 73, the motor 20 rotates the first gear 31 clockwise (from the perspective of FIG. 2). The clockwise rotation of the first gear 31 rotates the third gear 33 counter-clockwise. The counter-clockwise rotation of the third gear 33 rotates the second gear 32 and the lead screw 40 clockwise. The clockwise rotation of the lead screw 40 moves the second base 81 towards the first probe 73. The second base 81 accordingly moves the second probe 83 away from the first probe 73.

The probe apparatus 100 can be used to measure distance between two given points on an object (not shown). In one typical example, the first probe 73 aligns with one of the given points. The motor 80 moves the second probe 83 toward the other given point. When the second probe 83 aligns with the other given point, the distance between two given points can be measured.

One advantage of the probe apparatus 100 is that the probe apparatus 100 is equipped with a reduction gear unit 30 with a total gear ratio less than 1. The reduction gear unit 30 is used to transmit power from the motor 20 to the second probe 83 through the lead screw 40. With this configuration, the second probe 83 can be moved slowly and precisely, and thus the probe apparatus 100 can be used to precisely measure a length of an object. In this embodiment, precise measurement can be further achieved by moveably attaching the second probe assembly 83 to the guide members 50 to diminish displacement of the second probe assembly 83 due to vibration.

It is understood that the above-described embodiment is intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A probe apparatus, comprising:
a fixture comprising a top board, a first pedestal and a second pedestal, the first and second pedestals parallel to each other and extending downwardly from opposite sides of the top board, the top board, the first pedestal and the second pedestal cooperatively defining a receiving space;
a first probe assembly fixedly attached to the first pedestal of the fixture, the first probe assembly comprising a first probe;
a motor entirely accommodated in the receiving space and fixedly attached to the first pedestal of the fixture, the motor having a drive shaft attached to the fixture;
a lead screw coupled to the fixture;
at least one guide member attached to the fixture parallel to the lead screw;
a second probe assembly moveably attached to the lead screw and the at least one guide member, the second probe assembly comprising a second probe; and
a reduction gear unit fixedly attached to the second pedestal of the fixture, and coupled to the drive shaft and the lead screw to transmit power from the motor to the second probe assembly through the lead screw, with the second probe assembly configured for moving the second probe towards or away from the first probe along the at least one guide member;
wherein the lead screw comprises a first end rotatably attached to the first pedestal of the fixture and a second end rotatably attached to the second pedestal of the fixture;
the at least one guide member comprises a first end fixedly attached to the first pedestal of the fixture and a second end fixedly attached to the second pedestal of the fixture;
both the lead screw and the at least one guide member are entirely accommodated in the receiving space and arranged parallel to each other in a same imaginary horizontal plane parallel to the top board; and the motor is located above the lead screw.

2. The probe apparatus of claim 1, wherein the reduction gear unit comprises:

a first gear coupled to the drive shaft;

a second gear coupled to the lead screw; and a third gear meshed with the first gear and the second gear, the third gear having a passive shaft attached to the fixture, wherein a number of teeth of the third gear is greater than a number of teeth of the first gear, and a number of teeth of the second gear is greater than a number of teeth of the third gear.

3. The probe apparatus of claim 2, wherein the drive shaft, the passive shaft, the lead screw, and the at least one guide member are arranged between the pedestals.

4. The probe apparatus of claim 3, wherein the first probe assembly comprises a base fixed to one of the two pedestals, and the first probe is fixed to the base.

5. The probe apparatus of claim 2, wherein the drive shaft, the passive shaft, and the lead screw are parallel with one another.

6. The probe apparatus of claim 5, wherein the at least one guide member comprises two parallel guide pins arranged at opposite sides of the lead screw.

7. The probe apparatus of claim 6, wherein the second probe assembly further comprises a base, the second probe is fixed to the base, and the base has a first through hole and two second through holes defined therein, the first through hole is configured for receiving a portion of the lead screw, and the two second through holes each are configured for receiving a portion of the corresponding guide pin.

8. The probe apparatus of claim 7, wherein the first through hole is a screw hole meshed with the lead screw.

9. The probe apparatus of claim 7, further comprising a ball screw bearing mounted in the first through hole for coupling the lead screw to the base of the second probe assembly.

10. The probe apparatus of claim 1, wherein the first probe and the second probe are parallel with each other.

11. The probe apparatus of claim 1, wherein the motor is a step motor.

12. A probe apparatus, comprising:

a fixture comprising a top board, a first pedestal and a second pedestal, the first and second pedestals parallel to each other and extending downwardly from opposite sides of the top board, the top board, the first pedestal and the second pedestal cooperatively defining a receiving space;

a first probe assembly fixedly attached to the first pedestal of the fixture, the first probe assembly comprising a first probe;

a motor entirely accommodated in the receiving space and fixedly attached to the first pedestal of the fixture, the motor having a drive shaft attached to the fixture;

a lead screw coupled to the fixture;

at least one guide member attached to the fixture;

a second probe assembly moveably attached to the lead screw and the at least one guide member, the second probe assembly comprising a second probe; and a reduction gear unit fixedly attached to the second pedestal of the fixture and including a first gear coupled to the drive shaft, a second gear coupled to the lead screw, and a third gear meshed with the first gear and the second gear, the third gear having a passive shaft attached to the fixture, the reduction gear unit configured for transmitting power from the motor to the second probe assembly through the lead screw, and the second probe assembly configured for moving the second probe towards or away from the first probe along the at least one guide member;

wherein the lead screw comprises a first end rotatably attached to the first pedestal of the fixture and a second end rotatably attached to the second pedestal of the fixture;

the at least one guide member comprises a first end fixedly attached to the first pedestal of the fixture and a second end fixedly attached to the second pedestal of the fixture;

both the lead screw and the at least one guide member are entirely accommodated in the receiving space and arranged parallel to each other in a same imaginary horizontal plane parallel to the top board; and the motor is located above the lead screw.

13. The probe apparatus of claim 12, wherein a number of teeth of the third gear is greater than a number of teeth of the first gear, and a number of teeth of the second gear is greater than a number of teeth of the third gear.

14. The probe apparatus of claim 12, wherein each of the drive shaft, the passive shaft, the lead screw, and the at least one guide member is arranged between the two pedestals.

15. The probe apparatus of claim 12, wherein the drive shaft, the passive shaft, and the lead screw are parallel with one another.

16. The probe apparatus of claim 15, wherein the at least one guide member comprises two parallel guide pins arranged at opposite sides of the lead screw.

17. The probe apparatus of claim 16, wherein the second probe assembly further comprises a base, the second probe is fixed to the base, and the base has a first through hole and two second through holes defined therein, the first through hole is configured for receiving a portion of the lead screw, and the two second through holes each are configured for receiving a portion of the corresponding guide pin.

18. The probe apparatus of claim 17, wherein the first through hole is a screw hole meshed with the lead screw.

19. The probe apparatus of claim 17, further comprising a ball screw bearing mounted in the first through hole for coupling the lead screw to the base of the second probe assembly.

* * * * *